United States Patent [19]
Campbell

[11] Patent Number: 5,157,069
[45] Date of Patent: Oct. 20, 1992

[54] NONIONIC WATERBORNE BASECOAT USING METALLIC PIGMENTS AND CLEAR TOPCOAT

[75] Inventor: Donald H. Campbell, Milford, Mich.

[73] Assignee: BASF Corporation, Southfield, Mich.

[21] Appl. No.: 741,279

[22] Filed: Aug. 7, 1991

[51] Int. Cl.$^5$ ............................................. C08L 75/04
[52] U.S. Cl. .................................... 524/500; 524/502; 524/507; 524/560; 524/591; 524/832; 524/839
[58] Field of Search ............... 524/500, 502, 507, 560, 524/591, 832, 839

*Primary Examiner*—Maurice J. Welsh
*Attorney, Agent, or Firm*—Frank G. Werner

[57] ABSTRACT

The present invention is directed to an aqueous coating composition, comprising:
  a) an aqueous nonionic dispersion of a polymer selected from the group consisting of a acrylic resin, polyurethane resin and mixtures thereof;
  b) a nonionic water soluble polymer having a molecular weight of from about 3,000 to about 200,000 daltons;
  c) pigments; and
  d) optionally additives selected from the group consisting of crosslinkers, organic solvents, surfactants, rust inhibitors, catalysts, and mixtures thereof.

The new aqueous coating composition is stable in the presence of acids and bases especially with the cure of crosslinkers.

19 Claims, No Drawings

NONIONIC WATERBORNE BASECOAT USING METALLIC PIGMENTS AND CLEAR TOPCOAT

FIELD OF THE INVENTION

The present invention is directed to a nonionic waterborne basecoat for the multilayer coating of an automotive vehicle, more specifically it is directed to an aqueous coating composition comprising a dispersion of an acrylic resin or a polyurethane resin stabilized with a nonionic water soluble polymer.

BACKGROUND OF THE INVENTION

Multi-layer systems have been utilized to coat automobiles for a number of years, but the early development of these systems necessarily employed organic solvents. As environmental regulations became more stringent organic-borne systems became less desirable. The recent research emphasis in the area of multi-layer systems, especially basecoat systems, has focused on the development of water-borne systems for multi-layer coatings.

The known aqueous basecoats use anionically stabilized resins.

The U.S. Pat. No. 4,403,003 discloses a basecoat which comprises a dispersion of crosslinked polymer microparticles in an aqueous medium. But these microgels have the deficiencies of being ardorous to make and difficult to stabilize.

The U.S. Pat. No. 4,719,132 discloses a process for producing multi-layered coated articles. The film forming composition is an aqueous anionic polyurethane dispersion.

These basecoats have several drawbacks which relate to the preferred stabilization method. The preferred amines used to salt the acid groups interfere with the cure of strong acid catalyzed melamine clearcoats. This results in softer clearcoat and/or wrinkling in the clearcoat. Addition of acids, such as those used to produce lower temperature curing melamine systems, results in flocculation or coagulation of the anionically stabilized resin. Exposure of the anionically stabilized basecoats to polyvalent cations, such as those be released from corrosion of steel, also result in flocculation or coagulation of the anionically stabilized resin.

An object of the present invention is to provide an aqueous coating composition which is stable in the presence of acids and bases and which does not interfere with the cure of crosslinkers like melamine.

Another object is to provide a basecoat with a good appearance (metallic effect).

Another object is to provide a multilayer coating system.

SUMMARY OF THE INVENTION

The objects of the present invention are achieved with an aqueous coating composition, comprising:
a) an aqueous nonionic dispersion of a polymer selected from the group consisting of an acrylic resin, polyurethane resin and mixtures thereof;
b) a nonionic water soluble polymer having a molecular weight of from about 3,000 to about 200,000 daltons;
c) pigments; and
d) optionally additives selected from the group consisting of crosslinkers, organic solvents, surfactants, rust inhibitors, catalysts, and mixtures thereof.

DETAILED DESCRIPTION OF THE INVENTION

The expression (meth)acrylate with parenthesis as used herein includes acrylate and methacrylate.

Suitable acrylic resins according to the invention are obtainable by polymerizing
i) about 20 to 100% by weight ethylenically unsaturated carboxylic alkyl esters
ii) about 0 to 80% by weight of other ethylenically unsaturated monomers
iii) about 0 to 50% by weight of an ethylenically unsaturated monomer with a crosslinkable group.

Preferred acrylic resins comprise:
i) about 60 to 98% by weight ethylenically unsaturated carboxylic alkyl esters
ii) about 1 to 60% by weight of other ethylenically unsaturated monomers
iii) about 1 to 30% by weight of an ethylenically unsaturated monomer with a crosslinkable group.

Suitable ethylenically unsaturated carboxylic alkyl esters (i) are (meth) acrylic alkyl ester derived from alcohols having 1 to about 20 carbon atoms.

Suitable examples are methyl(meth)acrylate, ethyl(meth)acrylate, propyl(meth)acrylate, n-butyl(meth)acrylate, isobutyl(meth)acrylate, tert.-butyl(meth)acrylate and 2-ethylhexyl(meth)acrylate. Maleic acid or fumaric acid dialkyl esters in which the alkyl groups have 1 to 20 carbon atoms could also be used. Other suitable examples are monoesters of monoalkoxy polyalkylene glycols with (meth)acrylic acid or diesters of monoalkoxy polyalkylene glycols with maleic or fumaric acid. The monoalkoxy polyalkylene glycols comprise $C_1$ to $C_{18}$ alkoxylated polyethylene glycol, polypropylene glycol and polyethylene polypropylene glycol copolymers of an average molecular weight of from about 800 to about 3000 daltons like alpha-acryloyl-omega-methyl-polyethylene oxide 2000.

Preferred are methyl (meth)acrylate, n-butyl (meth)acrylate, 2-ethylhexyl(meth)acrylate and monoesters of monoalkoxy polyethylene glycol with (meth)acrylic acid.

Suitable other ethylenically unsaturated monomers (ii) are vinylaromatics such as styrene, alpha-methylstyrene, vinyltoluene, tert.-butylstyrene, halogenated vinylbenzenes such as chlorostyrene, vinylchloride, (meth)acrylamide, (meth)acrylonitrile, monoallylethers of monoalkoxy polyalkylene glycols like alpha-allyloxy-omega-methyl-polyethylene oxide 2000.

Suitable ethylenically unsaturated monomers with a crosslinkable group (iii) contain hydroxyl, epoxy, silane, isocyanato, N-hydroxyalkyl or allyl groups. Examples are hydroxyethyl(meth)methacrylate, hydroxypropyl(meth)acrylate, isocyanatoethyl(meth)acrylate, hydroxybutyl(meth)acrylate, propyleneglycolmono(meth)acrylate, 2,3-dihydroxypropyl(meth)acrylate, pentaerythritolmono(meth)acrylate, polyalkyleneglycolmono(meth)acrylates, like polyethyleneglycolmono(meth)acrylate, polypropyleneglycolmono(meth)acrylate and polyethylene polypropylenemono(meth)acrylate, and meta-isopropenyl-alpha, alpha-dimethylbenzylisocyanate.

Other examples of monomers (iii) are maleic acid and fumaric acid dihydroxyalkyl esters in which the straight chained, branched or cyclic alkyl group contains 2 to 20 carbon atoms or diesters of maleic acid or fumaric acid with polyethylene glycol, polypropyleneglycol or polyethylene polypropylene glycol copolymers of an average molecular weight of from about 800 to about 3000 daltons. N-hydroxyalkyl (meth) acrylamides and N-hydroxyalkyl fumaric acid mono- or diamides may also be used like N-hydroxyethyl-acrylamide or N-(2-hydroxypropyl)methacrylamide. Other hydroxyl group-containing compounds include allyl alcohol, monovinylethers of polyols, especially diols, such as monovinylethers of ethyleneglycol and butane diol, and hydroxyl group containing allyl ethers or esters such as 2,3-dihydroxypropyl-monoallyl ether, trimethylolpropanemonoallyl ether or 2,3-dihydroxypropanoic acid allyl ester.

Glycidyl(meth)acrylate, mono-, di-, or trialkoxy silane (meth)acrylates such as trimethoxy (propyl(meth)acryloyl)silane, are also suitable.

Preferred are glycidyl(meth)acrylate, hydroxypropyl(meth)acrylate and hydroxybutyl(meth)acrylate.

Copolymerization is carried out using conventional techniques such as heating the monomers in the presence of a polymerization initiating agent and optionally chain transfer agents. The copolymerization may be carried out by bulk, emulsion or by suspension polymerization, preferred are the latter two. In general the use of surfactants is not necessary; however, in the case of an emulsion polymerization, micelle formation may be accomplished by small amounts of surfactants. These may be either anionic, nonionic or cationic. Nonionic surfactants are preferred, such as nonylphenolethoxylates (30–40 ethylene oxide units).

Suitable solvents are ethylene glycol or propylene glycol and their derivatives, such as dipropylene glycol monomethylether and ethylene glycol monobutyletheracetate; alcohols, such as butylalcohol and diacetonealcohol; ketones, such as methylpropylketone and acetone; esters, such as butylacetate and pentylpropionate; ethers, such as dioxane and tetrahydrofuran; and other compatible solvents, such as N-methylpyrrolidone and mixtures thereof.

Typical initiators are peroxides such as dialkylperoxides, peroxyesters, peroxydicarbonates, diacylperoxides, hydroperoxides, and peroxyketals and azo compounds such as 2,2'-azobis (2-methylbutanenitrile) and 1,1'-azobis (cyclohexanecarbonitrile) or persulphates such as potassium persulphate. Also redox couples using metal ions and reducing agents in combination with the above initiators such as potassium persulphate and ferrous sulphate and sodium metabisulphite are suitable.

Typical chain transfer agents are mercaptans such as octylmercaptan, n- or tert.-dodecylmercaptan; halogenated compounds; thiosalicyclic acid, mercaptoacetic acid, mercaptoethanol, buten-1-01, and imeric alphamethylstyrene. Mercaptans are preferred.

The reaction is usually carried out at temperatures from about 20° to about 100° C. The reaction may conveniently be done at the temperature at which the solvent or solvent mixture reflux may be maintained. The initiator should be chosen to match the temperature at which the reaction is carried out, so that the half-life of the initiator at that temperature should preferably be between one minute and thirty minutes.

The solvent or water-solvent mixture is generally heated to the reaction temperature and the monomers and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

The acrylic resin has a weight average molecular weight of from about 2,000 to about 1,000,000, preferably from about 10,000 to about 25,000.

Suitable polyurethane resins are obtainable by reacting iv) an organic compound having at least two reactive hydrogen functionalities and v) a polyisocyanate.

Organic compounds (iv) having at least two reactive hydrogen functionalities are well known in the art and described for example in U.S. Pat. Nos. 4,489,135 or 4,791,168, or 4,794,147 or 4,822,685 or 4,914,148. Suitable for the present invention are polyols having a hydroxyl functionality of 2 to 6, preferably of 2 to 3 and a molecular weight of 62 to 12,000. Examples for low molecular weight diols are ethylene glycol, 1,3-propanediol, 1,4-butanediol, neopentyl glycol, dimethylolcyclohexane and examples for higher functional alcohols are trimetylolethane, trimethylolpropane and pentaerythritol. Examples for higher molecular weight polyols are polyether di- or triols and polyester di- or triols with molecular weight of 400 to 5,000.

Preferred polyols are polyester diols and polyether diols having a molecular weight of from 400 to 3,000 and low molecular weight diols having a molecular weight of from 62 to 400.

Examples of suitable diamines having primary and/or secondary amino groups, include alkanolamines such as diethanol amine, alkylene diamines such as ethylene diamine, propylene diamine and hexamethylene diamine; branched polyamines such as tetraethylene pentamine, triethylene tetraamine, diethylene triamine, tris(2-aminoethyl)amine and various polyoxyalkylene amines which are commercially available under the trademark JEFFAMINE from Texaco.

Preferred diamines have secondary amino groups.

Polyisocyanates (iv) are well known in the art and comprise aliphatic, cycloaliphatic and/or aromatic polyisocyanates containing at least 2 isocyanate groups per molecule.

Examples of aliphatic diisocyanates useful in the present invention are trimethylene diisocyanate, tetramethylene diisocyanate, pentamethylene diisocyanate, hexamethylene diisocyante, propylene diisocyanate, ethylethylene diisocyanate, dimethylethylene diisocyante, methyltrimethylene diisocyanate and trimethylhexane diisocyanate.

Examples of cycloaliphatic diisocyanates include isophorone diisocyanate, cyclopentylene diisocyanate and the hydrogenation products of aromatic diisocyanates such as cyclohexylene diisocyanate, methylcyclohexylene diisocyanate and dicyclohexylmethane diisocyanate.

Suitable aromatic diisocyanates include phenylene diisocyanate, tolylene diisocyanate, xylylene diisocyanate, biphenylene diisocyanate, naphthylene diisocyanate and diphenylmethane diisocyanate or isomers or isomeric mixtures thereof.

Examples of triisocyanates useful in the present invention are the buiret of hexamethylene diisocyanate and water, the isocyanurate of hexamethylene diisocyanate and the product of addition of isophorone diisocyanate to trimethylolpropane.

Preferred polyisocyanates are aliphatic or cycloaliphatic diisocyanates. Particularly preferred is isophorone diisocyanate.

Components (iv) and (v) may be reacted in a "one shot" or prepolymer process. In the prepolymer process one part or one component of (iv) or mixtures thereof is reacted with an excess of the polyisocyanate (v) to form an isocyanate prepolymer. The prepolymer is then reacted with another part or another component of (iv) or mixtures thereof to form the final polyurethane.

In the "one shot" process all components (iv) and (v) are reacted together with or without a solvent to form the polyurethane. The reaction temperature may be up to about 150° C. but is preferably in the range of from about 50° to about 130° C.

The molar ratio of the hydrogen functionality of component (iv) to the isocyanate group of (v) is from about 0.8 to about 1.3, preferably from about 1.0 to about 1.25.

The molecular weight of the resulting polyurethane is from about 2,000 to about 30,000, preferably about 8,000 to about 20,000, and most preferably about 10,000 to about 14,000.

The reaction may be carried out in the presence of a catalyst such as organic tin compounds and/or tertiary amines. Organic solvents which do not contain Zerewitinoff active hydrogen may be added in order to keep the reactants in a liquid state and improve the reaction temperature control. Suitable solvents include, for example, dimethyl formamide, esters, ethers such as diethylene glycol dimethyl ether, keto esters, ketones such as methyl ethyl ketone and acetone, ketones substituted with methoxy groups, such as methoxyhexanone, glycol ether esters, chlorinated hydrocarbons, aliphatic and alicyclic hydrocarbon pyrrolidones such as N-methyl pyrrolidone, hydrogenated furans, aromatic hydrocarbons and mixtures thereof. The quantity of solvent may vary within wide limits and show be sufficient to form a prepolymer solution having a suitable viscosity. It is in the most cases sufficient to use from about 5 to about 50% by weight of solvent, preferably about 20 to about 40% by weight of solvent, used on the solids content.

Preferred solvents are ketones such as methyl ethyl ketone, methyl propyl ketone, and methyl isobutyl ketone.

For the preparation of the aqueous dispersion, the polyurethane is diluted with deionized water under agitation.

The nonionic soluble polymer (b) is acting as a rheology control agent and may be a polyether, cellulose, cellulose-derivatives, polyvinylalcohol, polyvinylmethylether, polyvinylpyrrolidone and the like.

Preferred are polyether and cellulose. The molecular weight is from about 3,000 to 200,000 daltons, preferably 20,000 to 100,000 daltons; most preferably 40,000 to 80,000 daltons.

Polymer (b) is present in an amount of from about 0.5% by weight to about 30% by weight, preferably 2.0% by weight to about 10% by weight, based on the weight of the acrylic resin or polyurethane resin or mixtures thereof.

The pigments (c) according to the present invention may be flake pigments, organic pigments, inorganic pigments of mixtures thereof.

Suitable examples are graphite, carbon black, zinc lead cyanide, titanium dioxide, zinc oxide, iron oxide, cadmium sulfide, iron oxide, aluminum flakes, mica flakes, zinc sulfide, perylene reds, quinacridones and halogenated thioindigo pigments, among others.

The preferred flake pigments are aluminum metal flakes and micas. Preferred aluminum flake pigments are available from Silberline Corp., Lansford, Pa. or from Eckart Werke, Guentersthal, Germany. Preferred micas are available from the Mearl Corp., New York, N.Y. and EM Chemicals, Hawthorne, N.Y. In a preferred embodiment of the present invention standard grade aluminum stabilized with phosphate ester is used. The flake pigments may also be mixed with non-flake pigments, but these are to be carefully chosen so as not to diminish the desired metallic effect.

Suitable amounts of the pigments (c) range from about 4% by weight to about 200% by weight, preferably from about 4% by weight to about 120% by weight, based on the weight of the acrylic resin or polyurethane resin or mixtures thereof.

The additives (d) are optional and may be crosslinkers, organic solvents, surfactants, wetting-agents, conditioning agents, plasticizers, rust inhibitors, catalysts, initiators, biocides, fungicides, pot-life extenders, light stabilizers, antioxidants and the like.

Suitable crosslinkers may be aminoplasts, polyisocyanates, polycarbamates, (poly)siloxanes, polycarbodimides, polyamines, polyepoxides and the like.

Preferred are aminoplast resins.

Aminoplast resins are aldehyde condensation products of melamine, urea, and similar compounds. Products obtained from the reaction of formaldehyde with melamine, urea or benzoguanamine are most common and are preferred. However, condensation products of other amines and amides can also be employed, for example, aldehyde condensates of triazines, diazines, triazoles, guanidines, guanamines and alkyl- and aryl-substituted ureas and alkyl- and aryl-substituted melamines. Some examples of such compounds are N,N-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diamino-triazole, triaminopyrimidine, 2-mercapto-4,6-diaminopyrimidine, 2,4,6-triethyltriamino-1,3,5-triazine, and the like.

While the aldehyde employed is most often formaldehyde, other similar condensation products can be made from other aldehydes, for example, acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols, as methanol, ethanol, propanol, butanol, pentanol, hexanol, heptanol and others, as well as benzyl alcohol and other aromatic alcohols, cyclic alcohols for example cylohexanol, monoethers of glycols such as Cellosolves and Carbitols TM (Union Carbide), and halogen-substituted or other substituted alcohols, such as 3-chloropropanol. The preferred amine-aldehyde resins are etherified with methanol or butanol.

The crosslinkers may be used in amounts of from about 0% by weight to about 60% by weight and if they are used, preferably from about 5% by weight to about 30% by weight, based on the weight of the acrylic resin or polyurethane resin or mixtures thereof.

Organic solvents may also be used, for example, low-boiling mono- and polyhydric alcohols, ethers, esters, ketones and other organics.

An especially preferred solvent is ethylenglycol-monobutylether (Butyl Cellosolve TM) which aids mixing, formulating and dispersing pigment in the basecoat.

The solvents may be used in an amount of from about 0% by weight, based on the weight of the acrylic resin or the polyurethane resin or mixtures thereof.

The surfactants may be used for defoaming, flow properties of as a pigment dispersion aid. Suitable are anionic or nonionic surfactants like polysiloxanes or fluorocarbons.

Other additives like wetting-agents, conditioning agents, plasticisers, inhibitors, catalysts, initiators, biocides, fungicides, pot-life extenders, light stabilizers, antioxidants and the like may be used as they are currently in the coatings art.

The solid content of the final aqueous basecoat is from about 10 to about 60% by weight, preferably from about 15 to about 45% by weight.

The basecoat described hereinabove can be applied to a metal or plastic substrate in one or two coats using for example an air atomizer (Binks Model 60 spray gun, available from Binks Manufacturing Corporation, Franklin Park, Ill.), or by using other conventional spraying means. The basecoat may also be applied electrostatically.

After being deposited, the basecoat is flash dried within a temperature range of from about room temperature to about 145° C. for between about 30 seconds and about 10 minutes using warm air blowing at a relative humidity of about 5 to about 40%. The preferred flash temperature is about 120° C. which is carried out for preferably between about 1 and about 5 minutes. The flash conditions described herein result in about 90 to about 95% of the solvents including water being flashed from the basecoat in this short period of time.

After the first basecoat is deposited, a second basecoat can be deposited over the first without drying (flash off), or alternatively, a clearcoat may be deposited over the flashed basecoat. Any number of clearcoats known in the art may be used. Any known unpigmented or other transparently pigmented coating agent is in principle suitable for use as a clearcoat.

After the clearcoat is coated onto the basecoat layer, the multi-layer coating is then baked to crosslink the polymeric vehicle and to drive the small amount of residual water and organic solvent from the multi-layered coating. A preferred baking step involves heating the coated substrate for a period of about 10 to about 60 minutes at a temperature of between about 150° and about 300° C. The baking step cures the coating to a hard, durable film.

EXAMPLES

Preparation of aqueous polymer dispersion

| | |
|---|---|
| 1960.0 g | deionized water, |
| 133.8 g | nonyl phenol ethoxylate (Triton X305; Rohm & Haas), |
| 7.0 g | erythorbic acid, |
| 280 g | mono ester of polyethylene glycol with methacrylic acid (HEM-5 from Alcolac), |
| 280 g | 4-hydroxybutylacrylate, |
| 840 g | 2-ethylhexylacrylate, |
| 560 g | n-butylmethacrylate, |
| 840 g | styrene, and |

-continued

| | |
|---|---|
| 44.8 g | dodecylmercaptan | are charged to the agitated monomer tank.

| | |
|---|---|
| 280 g | deionized water and |
| 23.8 g | 35% Hydrogen Peroxide in water (Albone 35 from DuPont) | are charged to the initiator tank.

The mixture in the reactor is heated to 60° C. The monomers are then added uniformly over 4 hrs. The initiator is fed simultaneously at a rate which would complete the add in 6 hrs.

When the monomer addition is complete, 1.4 g of erythorbic acid is added to the initiator tank and the initiator flow rate is doubled. This completes the initiator add 1 hr after the monomer addition is complete. The dispersion is then held at 60° C. for an additional 30 minutes, then cooled. The temperature of the mixture in the reactor is maintained at 60°-64° C. throughout the monomer and initiator additions. This process results in a dispersion of uncrosslinked polymer microparticles with an average diameter of 180 nm (QELS) with low coagulum content and 40-43% N.V.

The emulsion is then neutralized to pH 7.0-7.6 with N-ethylmorpholine.

Preparation of Pigment Slurry Resin

This resin is used to achieve adequate dispersion of the aluminum flake in water.

A 5 liter round bottom flask is equipped with an agitator, thermometer, water cooled condenser, agitated monomer tank (A), non-agitated monomer tank (B) and an initiator tank (C).

Charge to flask:
  500 g ethylene glycol monobutyl ether
Charge to A:
  600 g deionized water
  333 g alpha-allyloxy-omega-methyl-polyethylene oxide 2,000
Charge to B:
  416 g ethylacrylate
  416 g 2-hydroxyethylacrylate
  250 g 2-ethylhexylacrylate
  250 g styrene
  122 g t-butylperoctoate
  267 g ethylene glycol monobutylether
Charge to C:
  33 g t-butylperoctoate
  80 g ethylene glycol monobutylether The flask charge is heated to 100° C. Simultaneously, contents of A is added uniformly over a 2 hr period and contents of B is added uniformly over a 3 hr period.

The reflux temperature gradually drops from 100° C. to 95° C. over the additions A and B.

30 minutes after the contents of B have been added, the contents of C is added uniformly over a 40 min period. The reaction mixture is held at 92°-96° C. for 90 minutes and then cooled.

This process yields an opaque viscous resin of 45%-48% N.V. with an acid number of 3-4.

Preparation of the basecoat

1. Pigment Slurry 64.9 g aluminum paste (chromated), 47.1 g hexamethoxy methlmelamine (Cymel 327) and 47.1 g pigment slurry resin, described above are mixed together in 30 min. under high speed agitation to a homogeneous mixture.

2. Water soluble polymer solution 47 g polyethylene oxide (100k daltons, Polyox N10-UCAR) are solved in 569 g deionized water.

3. Basecoat 79.6 g pigment slurry (1), 30 g water soluble polymer solution (2), 150 g deionized water and 40 g n-butanol are added under agitation to 181 g of the aqueous polymer dispersion, described above.

The pH is adjusted to 7.1 with N-ethylmorpholine.

This basecoat has a solid content of 25% and is very pseudoplastic.

Appearance Testing of Basecoat

The basecoat is applied to steel test panels and evaluated for appearance. A layer of base coat is spray applied to a thickness of about 0.5 mils over a cold rolled steel panel which had been previously coated with an electrocoat primer layer. The wet panel is flash dried at 110° F. (43.3° C.) for five minutes. A high solids acrylic clear coat, crosslinked with a fully alkylated monomeric melamine crosslinking agent was then applied over the flashed base coat layer and the clear coated panels cured by baking at 250° F. (121° C.) for thirty minutes.

The appearance of the coated panels was then evaluated by measuring the reflectance with a Datacolor Model GPX-111 goniophotometer hiba, Inc., Charlotte, N.C. 28217). This device illuminates the measured surface at an incident angle of 45° and simultaneously measures L* (value) and a* and b* (hue) of light reflected at angles of 25°, 45°, and 70° from the specular angle (90° away from the illuminating beam). The L* values at these three angles were measured for several panels which were coated with the paint formulation in accordance with the present invention.

The parameter "C" is derived from the measured data by the following equation:

$$C = \frac{L^*25° - L^*45°}{L^*45° - L^*70°}$$

The value of C indirectly incorporated both a measure of the ratio of face brightness to flop brightness and a measure of the depth of flop or "travel". Depth of flop or travel is the rate at which the coated surface is seen to darken as the angle of view is changed from perpendicular to a larger angle of incidence. Larger values of C are thus indicative of better metallic effect.

A so-called "metallic" effect is achieved in coating systems by the incorporation of reflective particles such as aluminum flake or mica flake throughout the base coat layer, with best effect achieved when the particles are distributed uniformly throughout the base coat layer and the reflective faces of the flake particles are oriented more or less parallel to the base coat layer surface. When the desired particle orientation is achieved in a metallic finish coating, there is a large difference between the reflectance from the coated substrate when viewed face on (face brightness) and when viewed at a large angle of incidence (flop). A large face-to-flop reflectance ratio for a coating produces the most desirable aesthetic effect. This property relates directly to the ability of the resin system making up the base coat layer to assist in the proper orientation of the reflective particulates during drying and curing of the base coat layer.

The panel of the present invention showed a C value of 161, an excellent DOI (Distinctness of Image) of 80 and a gloss of 90.

I claim:

1. An aqueous coating composition, comprising:
   a) an aqueous nonionic dispersion of a polymer selected from the group consisting of an acrylic resin, polyurethane resin and mixtures thereof;
   b) a nonionic water soluble polymer having a molecular weight of from about 3,000 to about 200,000 daltons;
   c) pigments; and
   d) optionally additives selected from the group consisting of cross-linkers, organic solvents, surfactants, rust inhibitors, catalysts, and mixtures thereof.

2. The composition according to claim 1, wherein said acrylic resin is obtainable by polymerizing:
   i) about 20 to 100% by weight ethylenically unsaturated carboxylic alkyl esters;
   ii) about 0 to 80% by weight of other ethylenically unsaturated monomers; and
   iii) about 0 to 50% by weight of an ethylenically unsaturated monomer with a crosslinkable group.

3. The composition according to claim 2, wherein said ethylenically unsaturated carboxylic alkyl esters (i) are selected from the group consisting of acrylic alkyl esters, methacrylic alkyl esters, maleic dialkyl esters, fumaric dialkyl esters, monoesters of monoalkoxy polyalkylene glycol with acrylic and methacrylic acid, diesters of monoalkoxy polyalkylene glycol with maleic and fumaric acid and mixtures thereof.

4. The composition according to claim 2, wherein said other ethylenically unsaturated monomers (ii) are selected from the group consisting of vinylaromatics, (meth)acrylamide, (meth)acrylonitrile, monoallylethers of monoalkoxy polyalkylene glycols and mixtures thereof.

5. The composition according to claim 2, wherein said monomers (iii) contain crosslinkable groups selected from the group consisting of hydroxyl, epoxy, silane, isocyanato, N-hydroxy alkyl, and allyl groups.

6. The composition according to claim 1, wherein said polyurethane resin is obtainable by reacting:
   iv) an organic compound having at least two reactive hydrogen functionalities and
   v) a polyisocyanate.

7. The composition according to claim 6, wherein the reactive hydrogen functionalities of (iv) are selected from the group consisting of hydroxyl groups, amino groups and mixtures thereof.

8. The composition according to claim 6, wherein the compound (iv) is a polyol having a hydroxyl functionality of 2 to 6.

9. The composition according to claim 1, wherein said acrylic resin and said polyurethane resin have a molecular weight of from about 2,000 to 1,000,000 daltons.

10. The composition according to claim 1, wherein said nonionic water soluble polymer (b) is selected from the group consisting of polyether, cellulose, cellulose-derivatives polyvinylalcohol, polyvinylmethylether, polyvinylpyrrolidone and mixtures thereof.

11. The composition according to claim 10, wherein said polymer (b) has a molecular weight of from about 20,000 to about 100,000 dalton.

12. The composition according to claim 10, wherein said polymer (b) has a molecular weight of from about 40,000 to about 80,000.

13. The composition according to claim 1, wherein said polymer (b) is present in an amount of from about 0.5 to 30% by weight based on the weight of said acrylic resin or said polyurethane resin or mixtures thereof.

14. The composition according to claim 1, wherein said pigments (c) are selected from the group consisting of flake pigments, organic pigments, inorganic pigments and mixtures thereof.

15. The composition according to claim 14, wherein said pigments (c) are present in amounts of from about 4 to about 200% by weight, based on the weight of said acrylic resin or polyurethane resin of mixtures thereof.

16. The composition according to claim 1, wherein said crosslinker (d) is selected from the group consisting of aminoplasts, polyisocyanate, polycarbamates, polysilanes, polycarbodimides, polyamides, polyepoxides and mixtures thereof.

17. The composition according to claim 16, wherein said crosslinker (d) is present in an amount of from about 0 to about 60% by weight based on the weight of said acrylic resin or polyurethane resin or mixtures thereof.

18. A method of coating a substrate with multiple layers of a coating, comprising: applying the coating composition according to claim 1 on the substrate prior to applying at least one clearcoat on said basecoat.

19. A substrate coated with at least the coating composition according to claim 1.

* * * * *